(12) United States Patent
Motoshima et al.

(10) Patent No.: US 6,657,778 B1
(45) Date of Patent: Dec. 2, 2003

(54) OPTICAL AMPLIFICATION REPEATER AND OPTICAL AMPLIFICATION REPEATING AND TRANSMITTING SYSTEM

(75) Inventors: Kuniaki Motoshima, Tokyo (JP); Katsuhiro Shimizu, Tokyo (JP); Junichi Nakagawa, Tokyo (JP); Naoki Suzuki, Tokyo (JP)

(73) Assignee: Mitsubishi DenkiKabushiki Kaisha, Tokyo (JP)

( * ) Notice: Subject to any disclaimer, the term of this patent is extended or adjusted under 35 U.S.C. 154(b) by 0 days.

(21) Appl. No.: 09/806,456

(22) PCT Filed: Jul. 25, 2000

(86) PCT No.: PCT/JP00/04946

§ 371 (c)(1), (2), (4) Date: Apr. 18, 2001

(87) PCT Pub. No.: WO01/10063

PCT Pub. Date: Feb. 8, 2001

(30) Foreign Application Priority Data

Jul. 30, 1999 (JP) .......................................... 11-216187

(51) Int. Cl.[7] .............................................. H04B 10/12
(52) U.S. Cl. ............................. 359/337.1; 359/341.42; 359/349; 359/177; 359/161
(58) Field of Search ...................... 359/341.42, 337.1, 359/349, 177, 161

(56) References Cited

U.S. PATENT DOCUMENTS 5,280,383 A  * 1/1994 Federici et al. .......... 359/341.1
5,392,154 A  * 2/1995 Chang et al. ............... 359/124

(List continued on next page.)

FOREIGN PATENT DOCUMENTS

JP    6-21 97 A    1/1994
JP    6-21897 A    1/1994

(List continued on next page.)

OTHER PUBLICATIONS

Masuda et al. "Wide–Band and Low Noise Optical Amplification using Distributed Raman Amplifiers and Erbium–Doped Fiber Amplifiers." ECOC'98 Sep. 1998, pp. 51–52.*

(List continued on next page.)

Primary Examiner—Thomas G. Black
Assistant Examiner—Stephen Cunningham
(74) Attorney, Agent, or Firm—Birch, Stewart, Kolasch & Birch, LLP

(57) ABSTRACT

Light signals of first to n-th bands amplified en bloc undergo proper attenuation through an adjustable optical attenuator in conformance with attenuation in an optical fiber connected to input of an optical amplifying repeater apparatus, whereon the light signals are demultiplexed or separated into individual bands and amplified by first to n-th fixed-gain optical amplifiers (#1, . . . , #n) each having a high fixed gain in the respective bands to be subsequently multiplexed by an optical multiplexer and then sent out onto a transmission line. A monitoring light branching device extracts a part of light power of a specific monitoring wavelength, which is then fed to an adjustable attenuator control circuit which controls the attenuation factor of the adjustable optical attenuator so that the light power of the specific wavelength remains constant. The gain of the optical amplifying repeater apparatus at the specific wavelength can thus be determined. By employing as the optical amplifying medium a substantially homogeneous medium, the gain for the other wavelengths can be fixed. The optical amplifying repeater apparatus whose gain is essentially independent of the change in the number of the wavelengths can thus be realized.

6 Claims, 13 Drawing Sheets

U.S. PATENT DOCUMENTS

| | | | | |
|---|---|---|---|---|
| 5,452,116 A | * | 9/1995 | Kirkby et al. | 359/124 |
| 5,506,724 A | * | 4/1996 | Shimizu et al. | 359/337 |
| 5,510,930 A | | 4/1996 | Motoshima | 359/341 |
| 5,675,432 A | * | 10/1997 | Kosaka | 359/176 |
| 5,812,710 A | * | 9/1998 | Sugaya | 359/127 |
| 6,008,934 A | * | 12/1999 | Fatehi et al. | 359/176 |
| 6,151,160 A | * | 11/2000 | Ma et al. | 359/124 |
| 6,236,482 B1 | * | 5/2001 | Toyohara | 359/124 |
| 6,252,699 B1 | * | 6/2001 | Kohn | 359/177 |
| 6,275,329 B1 | * | 8/2001 | Sieben | 359/177 |
| 6,292,290 B1 | * | 9/2001 | Wan et al. | 359/124 |
| 6,307,668 B1 | * | 10/2001 | Bastien et al. | 359/337.1 |
| 6,335,823 B2 | * | 1/2002 | Ohshima et al. | 356/73.1 |
| 6,400,498 B1 | * | 6/2002 | Shimomura et al. | 359/337 |
| 6,407,836 B1 | * | 6/2002 | Fukushima | 359/124 |

FOREIGN PATENT DOCUMENTS

| | | | |
|---|---|---|---|
| JP | 7-240717 A | | 9/1995 |
| JP | 9-219696 A | | 8/1997 |
| JP | 9-238107 A | | 9/1997 |
| JP | 10-13357 A | | 1/1998 |
| JP | 10-126341 A | | 5/1998 |
| JP | 11-74595 A | | 3/1999 |
| JP | 11-174383 A | | 7/1999 |
| JP | 2000-78081 A | | 3/2000 |
| WO | WO 97/09757 | * | 3/1997 |
| WO | 11-46030 | * | 2/1999 |

OTHER PUBLICATIONS

Kawai et al. "Wide–Bandwidth and Long–Distance WDM Transmission Using highly Gain–Flattened Hybrid Amplifier." Photonic Tech. Lett. 11:7Jul. 7, 1999, pp. 886–888.*

Nakagawa et al. "1580 nm band erbium–doped fiber amplifier employing novel temperature compensating technique." OFCC 2000, Mar. 2000, pp. 108–110, vol. 2.*

Sugatani et al., Technical Research Report on the Institute . . . , vol. 95, No. 185, pp. 21–26.

Lee et al., IEEE Phototonics Technology Letters, vol. 10,No. 12, pp. 1721–1723.

"Optical Amplifiers & Their Applications," MD1, 1998.

* cited by examiner

OPTICAL AMPLIFICATION REPEATER AND OPTICAL AMPLIFICATION REPEATING AND TRANSMITTING SYSTEM

TECHNICAL FIELD

The present invention relates to an optical amplifying repeater apparatus implemented by using as a repeater an optical amplifier which is constituted by employing an optical fiber doped with laser activating substance(s) such as rare-earth element(s), transition metal(s) or the like and also relates to an optical amplifying/repeating transmission system in which the optical amplifying repeater apparatuses are made use of.

BACKGROUND TECHNIQUES

When compared with the conventional optical repeater having 3R (Reshaping, Retiming, Regenerating) functions known heretofore, the optical fiber amplifier has desirable features such as independency on the transmission rate, susceptibility to simplified implementation of the repeater, possibility of implementation with large capacity owing to the wavelength multiplexing capability and others. Thus, the optical fiber amplif ier is expected to promise a key component which is capable of enhancing flexibility of the optical communication system. In particular, in an optical network in which the wavelength multiplexing technique is adopted, it is possible to achieve remarkable economization.

As the conventional or prior art optical amplifying repeater apparatus of the type mentioned above, there can be mentioned, for example, the one disclosed in "OPTICAL AMPLIFIERS AND THEIR APPLICATION", PP. 280–283, 1998. FIG. 12 is a block diagram showing the prior art optical amplifying repeater apparatus disclosed in the above-mentioned publication.

In FIG. 12, reference numerals 1; 4 denote optical amplifiers each of fixed gain type for amplifying en bloc light signals of wavelengths $\lambda 1$ to $\lambda n$, numeral 3 denotes an adjustable optical attenuator, numeral 77 denotes an optical branching device for extracting a part of output power, numeral 6 denotes an optical attenuator control circuit for controlling the adjustable optical attenuator, numerals 501; 506 denote optical amplifiers, respectively, each implemented by making use of an erbium-doped fiber or the like, numerals 502 and 507 denote pumping light sources, respectively, numerals 503, 504, 508 and 509 denote optical branching devices for extracting parts of power of the light signals inputted thereto, respectively, and reference numerals 505 and 510 denote pumping light source control circuits for controlling the pumping light sources, respectively.

Next, description will be made of operation of the optical amplifying repeater apparatus. The wavelength-multiplexed light signals $\lambda 1$ to $\lambda n$ as inputted are first amplified by the fixed-gain optical amplifier 1 with a predetermined gain G0 and subsequently undergo attenuation with a predetermined attenuation factor through the adjustable optical attenuator 3. The wavelength-multiplexed light signals outputted from the adjustable optical attenuator 3 are again amplified by the fixed-gain optical amplifier 4 with a predetermined gain G1 to be ultimately outputted by way of the optical branching device 77. In that case, a part of the output signal is extracted through the optical branching device 77 and detected by the optical attenuator control circuit 6, which circuit is so designed as to control the factor of attenuation effectuated by the adjustable optical attenuator 3 so that the part of the output light signal extracted through the optical branching device 77 assumes a predetermined value. In this manner, the overall or total output power of the optical amplifying repeater apparatus is maintained at a constant value. In the case where the number of the wavelengths is constant, the output powers of the respective wavelengths can be maintained constant on a wavelength-by-wavelength basis, rendering it possible to realize ideal operation.

At this juncture, operation of the fixed-gain optical amplifier 1 will be described in detail. Input/output powers to/from the fixed-gain optical amplifier 1 are monitored through the optical branching devices 503 and 504, respectively, wherein the pumping light source control circuit 505 controls the pumping light source 102 such that the ratio between the input and output powers of the fixed-gain optical amplifier can be maintained to be constant. In this way, the gain of the fixed-gain optical amplifier 1 is held constant. Similar operation is performed for the fixed-gain optical amplifier 4 as well.

Furthermore, FIG. 13 shows in a block diagram another prior art optical amplifying repeater apparatus which is disclosed, for example, in "OPTICAL AMPLIFIERS AND THEIR APPLICATIONS", MD1, 1998. This optical amplifying repeater apparatus is so arranged as to perform not only amplification of the light signals of wavelengths $\lambda 1$ to $\lambda n$ but also gain control for the optical repeater on the basis of monitoring information carried by a monitoring light signal $\lambda s$ sent from terminal equipment. In FIG. 13, reference numeral 11 denotes an optical branching device for separating the monitoring light signal $\lambda s$ from the light signals of wavelengths $\lambda 1$ to $\lambda n$, and reference numeral 17 denotes a monitoring light receiver.

Next, description will turn to operation of the optical amplifying repeater apparatus described above. The wavelength-multiplexed light signals $\lambda 1$ to $\lambda n$ as inputted are first amplified by the fixed-gain optical amplifier 1 with a predetermined gain G0 to subsequently undergo attenuation with a predetermined attenuation factor through the adjustable optical attenuator 3. The wavelength-multiplexed light signals outputted from the adjustable optical attenuator 3 are again amplified by the fixed-gain optical amplifier 4 with a predetermined gain G1 to be outputted via the optical branching device 77. A part of the output signal is extracted through the optical branching device 77 and detected by the optical attenuator control circuit 6, which circuit is also so designed as to control the attenuation effectuated by the adjustable optical attenuator 3 so that the part of the output signal extracted through the optical coupling device 77 assumes a predetermined value. In this manner, the overall total output power of the optical amplifying repeater apparatus is maintained at a constant value or level. So long as the number of the wavelengths is constant, the output powers of the respective wavelengths can be maintained constant on a wavelength-by-wavelength basis, whereby ideal operation can be ensured. The information about the number of wavelengths is contained in the monitoring information carried by the monitoring light signal $\lambda s$ sent out from the terminal equipment and thus inputted to the optical attenuator control circuit 6 after reception by the monitoring light receiver 17.

In the optical amplifying repeater apparatus of the structures described above, a part of the total output power is extracted by the optical branching device 77 for the purpose of controlling the adjustable optical attenuator 3 so that the output power can be maintained to be constant. As a result of this, very troublesome procedure is required for coping with increase or decrease of the number of wavelengths. More specifically, because the total output power of the optical amplifying repeater apparatus depends on the number of wavelengths, there arises necessity of messaging in advance to the optical attenuator control circuit 6 the value which the light power extracted through the optical branching device 77 is to assume, when the number of wavelengths is changed. Consequently, in the case where one of the wavelength-multiplexed light signals of wavelengths λ1 to λn is not transmitted due to some failure in sender equipment, by way of example, the messaging procedure such as mentioned above will not be in time for coping with the change of the number of wavelengths, thus bringing about corresponding changes in the powers of the other wavelengths, which of course will exert adverse influence to the quality of communication.

An object of the present invention is to solve the problem such as mentioned above and to provide an optical amplifying repeater apparatus which can positively protect the quality of communication from being degraded even when the powers of the other wavelengths change and further provides an optical amplifying/repeating transmission system which can maintain the system gain to be constant independently of the light signal power as inputted or the number of wavelengths thereof.

DISCLOSURE OF THE INVENTION

An optical amplifying repeater apparatus which the present invention concerns includes an input port to which a plurality of light signals multiplexed in wavelength are inputted, a first fixed-gain optical amplifier for amplifying the wavelength-multiplexed light signals inputted through the input port with a predetermined gain, an adjustable optical attenuator for attenuating the wavelength-multiplexed light signals by a predetermined factor after amplification through the first fixed-gain optical amplifier, an optical demultiplexer for demultiplexing the wavelength-multiplexed light signals outputted from the adjustable optical attenuator into a plurality of individual light signals of discrete wavelengths, respectively, fixed-gain optical amplifiers #1; #n for amplifying the plurality of individual wavelength-demultiplexed light signals outputted from the optical demultiplexer with a predetermined gain, a monitoring light branching device connected to one of outputs of the second fixed-gain optical amplifiers #1; #n for extracting a part of a specific monitoring light signal, an optical multiplexer for multiplexing the individual light signals outputted from the second fixed-gain optical amplifiers #1; #n, respectively, for thereby outputting multiplexed light signals, and an adjustable attenuator control circuit for detecting output power of the monitoring light branching device to thereby control the attenuation factor of the optical attenuator so that the detected output power assumes a constant value.

Further, an optical amplifying repeater apparatus which the present invention concerns includes an input port to which a plurality of light signals multiplexed in wavelength are inputted, a first fixed-gain optical amplifier for amplifying the wavelength-multiplexed light signals inputted through the input port with a predetermined gain, an optical demultiplexer connected to output of the first fixed-gain optical amplifier for demultiplexing the wavelength-multiplexed light signals into a plurality of individual light signals of respective wavelengths, adjustable optical attenuators #1; #n for attenuating the outputs of the optical demultiplexers, respectively, by a predetermined factor, fixed-gain optical amplifiers #1; #n for amplifying the plurality of light signals outputted from the adjustable optical attenuators with a predetermined gain, monitoring light branching devices connected to outputs of the fixed-gain optical amplifiers #1; #n for extracting parts of specific monitoring light signals #1; #n, respectively, an optical multiplexer for multiplexing the outputs of the fixed-gain optical amplifiers #1; #n to thereby output multiplexed light signals, and adjustable attenuator control circuits #1; #n for detecting output powers of the monitoring light branching devices to thereby control the attenuation factor of the optical attenuators so that each of the detected output powers assumes a constant value.

In the optical amplifying repeater apparatus described above, the first fixed-gain optical amplifier includes an optical fiber serving as a transmission line, a pumping light source for iinducing stimulated Raman amplifying action internally of the optical fiber in wavelength bands of the plurality of wavelength-multiplexed light signals, and an optical coupling device for coupling the output of the pumping light source with the plurality of wavelength-multiplexed light signals.

Further, in the optical amplifying repeater apparatus described above, the first fixed-gain optical amplifier includes an optical fiber doped with a rare-earth element or alternatively a transition metal, a pumping light source for inducing amplifying action under stimulated emission internally of the optical fiber in wavelength bands of the plurality of wavelength-multiplexed light signals, and an optical coupling device for coupling the output of the pumping light source with the plurality of wavelength-multiplexed light signals, wherein the optical fiber doped with the rare-earth element or alternatively the transition metal is operative in an unsaturated region.

Further, in the optical amplifying repeater apparatuses described above, the fixed-gain optical amplifier #1; #n includes an optical amplifying unit composed of an optical fiber doped with a rare-earth element or alternatively a transition metal and a pumping light source for stimulating the rare-earth element or alternatively the transition metal to thereby bring about stimulated emission, a compensating light source for generating compensating light having a wavelength within an amplified wavelength band of the optical amplifying unit, an compensating light coupling device for coupling the compensating light with the plurality of wavelength-multiplexed light signals, a compensating light branching device for separating mutually the compensating light and the plural wavelength-multiplexed light signals contained in the output of the optical amplifying unit, and a compensating light control circuit for controlling output power of the compensating light source such that ratio between power of the compensating light outputted from the compensating light branching device and power of the compensating light outputted from the compensating light source assumes a predetermined standard value.

Furthermore, in the optical amplifying repeater apparatuses described above, the fixed-gain optical amplifier #1; #n includes an optical amplifying unit composed of an optical fiber doped with a rare-earth element or alternatively a transition metal and a pumping light source for stimulating the rare-earth element or alternatively the transition metal to thereby bring about stimulated emission, and a compensating light control circuit for controlling output power of the compensating light source such that power of spontaneously emitted light outputted from the optical amplifying unit assumes a predetermined standard value.

Furthermore, in the optical amplifying repeater apparatuses described above, the fixed-gain optical amplifier#1; #n includes an adjustable optical attenuator #1'; #n' inserted at an input or output side, whereby a means for changing the attenuation factor of the adjustable optical attenuator #1'; #n' in dependence on ambient temperature is implemented.

Additionally, an optical amplifying/repeating transmission system which the present invention concerns includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system further includes a control signal superposing means for superposing a control signal of a specific frequency onto one of the plural light signals, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant.

Moreover, an optical amplifying/repeating transmission systemwhich the present invention concerns includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system further includes a control signal generating means for modulating one of the plural light signals with a control signal of a specific frequency, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant.

Besides, an optical amplifying/repeating transmission system which the present invention concerns includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system includes a control signal superposing means for superposing a control signal of a specific frequency onto one of the plural light signals, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant, a monitor signal transmitting means for supplying transmission level of the control signal to the optical repeater, and a monitor/control means for receiving a monitoring signal supplied from the monitor signal transmitting means to thereby enable the optical repeater gain control means to operate when the level of the control signal is normal while disabling operation of the optical repeater gain control means with the gain thereof being held when the level of the control signal is abnormal.

Besides, an optical amplifying/repeating transmission system according to the present invention includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system further includes a control signal generating means for modulating one of the plural light signals with a control signal of a specific frequency, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant, a monitor signal transmitting means for supplying transmission level of the control signal to the optical repeater, and a monitor/control means for receiving a monitoring signal supplied from the monitor signal transmitting means to thereby enable the optical repeater gain control means to operate when the level of the control signal is normal while disabling operation of the optical repeater gain control means with the gain thereof being held when the level of the control signal is abnormal.

In the optical communication system described above, the optical repeater gain control means is composed of an adjustable optical attenuator and a means for controlling the adjustable optical attenuator.

Further, in the optical communication system described above, the control signal has a frequency higher than 100 kHz inclusive thereof.

Furthermore, in the optical communication system described above, the monitoring signal has a wavelength shorter than those sent out from the plurality of transmitters.

Moreover, an optical amplifying repeater apparatus for amplifying a plurality of wavelength-multiplexed light signals according to the present invention includes a first fixed-gain optical amplifier for amplifying a plurality of wavelength-multiplexed light signals inputted thereto with a predetermined gain, a control light signal branching device for extracting a part of power of a control wavelength contained in the output of the first fixed-gain optical amplifier, an adjustable optical attenuator for attenuating the output of the first fixed-gain optical amplifier by a predetermined factor, an adjustable attenuator control circuit for detecting output power of the control light signal branching device to thereby control the attenuation factor of the adjustable optical attenuator so that the detected output power remains constant, and a second fixed-gain optical amplifier connected to output of the adjustable optical attenuator for amplifying the plural wavelength-multiplexed light signal inputted to the second fixed-gain optical amplifier with a predetermined gain.

In the optical amplifying repeater apparatus described above further includes an output breaking circuit for stopping amplifying function of the second fixed-gain optical amplifier upon detection of disappearance of output of the control light signal branching device.

BEST MODES FOR CARRYING OUT THE INVENTION

Embodiment 1

Figure 1:
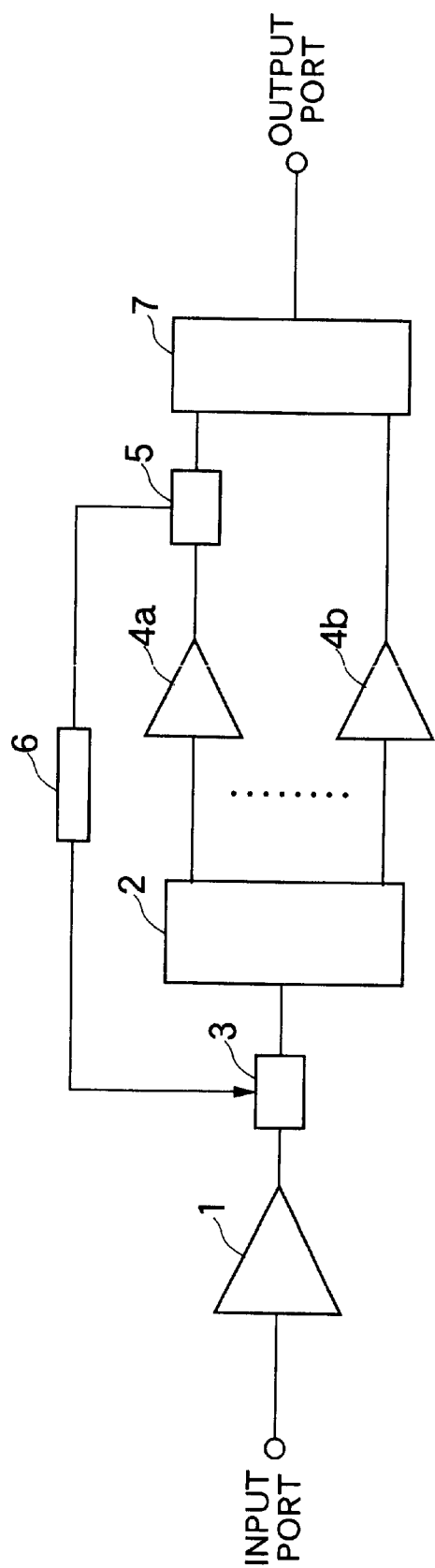
FIG. 1 is a block diagram showing a configuration or structure of an optical amplifying repeater apparatus according to a first embodiment of the present invention.

FIG. 1 is a block diagram showing a configuration or structure of an optical amplifying repeater apparatus according to a first embodiment of the present invention. In FIG. 1, reference numeral 1 denotes a first fixed-gain optical amplifier, numeral 2 denotes an optical demultiplexer, numeral 3 denotes an adjustable optical attenuator, numerals 4a; 4b denote fixed-gain optical amplifiers #1–#n, numeral 5 denotes a monitoring light branching device, numeral 6 denotes an adjustable attenuator control circuit, and reference numeral 7 denotes an optical multiplexer.

Next, operation of the optical amplifying repeater apparatus will be described. Referring to FIG. 1, the first fixed-gain optical amplifier 1 is designed to amplify wavelength-multiplexed light signals of n bands, i.e., wavelengths $\lambda 11$ to $\lambda 1n$ (first band), $\lambda 21$ to $\lambda 2n$ (secondband), . . . , $\lambda n1$ to $\lambda nn$ (n-th band) with a predetermined gain.

In the present state of the art, such a system has already been developed for practical applications in which two bands, e.g. a first band of 1530 to 1560 nm and a second band of 1570 to 1600 nm, are made available each for transmitting 32 light waves. As the first fixed-gain optical amplifier 1, a fiber amplifier doped with erbium or the like can be employed. The light signals of the first to n-th bands (#1, . . . , #n) amplified en bloc by the first fixed-gain optical amplifier 1 are then attenuated by the adjustable optical attenuator 3 properly in conformance to the attenuation which these light signals has undergone during transmission through an optical fiber connected to an input port of the optical amplifying repeater apparatus to be subsequently separated or multiplexed into respective bands by means of the optical demultiplexer 2. The light signals of the discrete bands resulting from the demultiplexing operation of the optical demultiplexer 2 are then amplified on a band-by-band basis by the fixed-gain optical amplifiers #1 to #n, respectively, each of which has a high fixed gain, to be subsequently multiplexed by means of the optical multiplexer 7, the output of which is sent onto a transmission line.

The monitoring light branching device 5 serves to extract a monitoring light signal of a specific wavelength, e.g. a part of light power of the wavelength $\lambda 1n$, which is then supplied to this adjustable attenuator control circuit 6. In response to the monitoring light signal, the adjustable attenuator control circuit 6 controls the attenuation factor of the adjustable optical attenuator 3 so that the light power of the wavelength $\lambda 1n$ becomes constant. Through the operation mentioned above, the gain of the optical amplifying repeater apparatus for the particular or specific wavelength can be determined. Accordingly, by employing as the optical amplifying medium a substantially homogeneous medium such as a semiconductor amplifier, an optical fiber doped with rare-earth element(s) or the like, the gain of the optical amplifying repeater apparatus for the other wavelengths can be fixed as well. Thus, there can be realized the optical amplifying repeater apparatus whose gain exhibits essentially no dependency on the change of the number of wavelengths. In this conjunction, it is conceivable that for the purpose of further enhancing the accuracy of the gain control described above, such a systemmay be adopted in which a tone signal of a specific frequency is superposed on the monitoring light signal, and the tone signal is extracted by an electric filter which is incorporated in the adjustable attenuator control circuit 6 for the purpose of suppressing the influence of noise.

Embodiment 2

Figure 2:
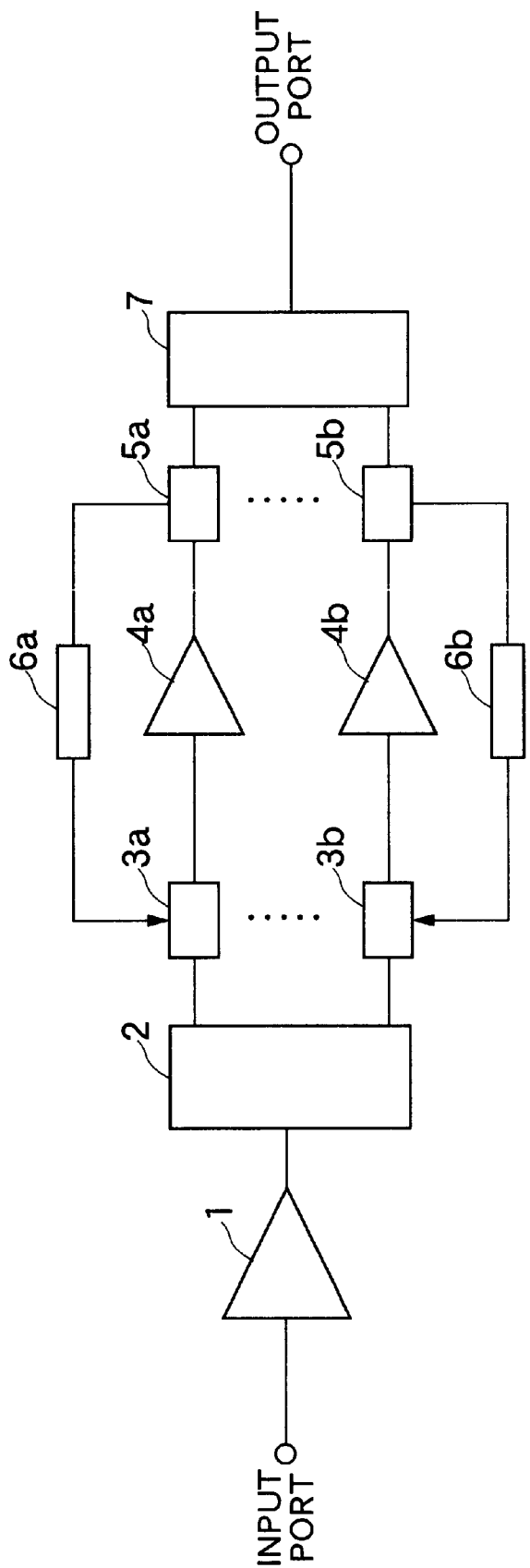
FIG. 2 is a block diagram showing a structure of an optical amplifying repeater apparatus according to a second embodiment of the invention.

FIG. 2 is a block diagram showing a configuration of the optical amplifying repeater apparatus according to a second embodiment of the invention. In FIG. 2, reference numeral 1 denotes a first fixed-gain optical amplifier, numeral 2 denotes an optical demultiplexer, numerals 3a; 3b denote adjustable optical attenuators #1–#n, respectively, numerals 4a; 4b denote fixed-gain optical amplifiers #1–#n, respectively, numerals 5a; 5b denote monitoring light branching devices #1–#n, respectively, numerals 6a; 6b denote adjustable attenuator control circuits #1–#n, respectively, and reference numeral 7 denotes an optical multiplexer.

Next, operation of the optical amplifying repeater apparatus according to the instant embodiment will be described. Referring to FIG. 2, the first fixed-gain optical amplifier 1 is designed to amplify wavelength-multiplexed light signals of n bands, i.e., wavelengths 11 to $\lambda 1n$ (first band), $\lambda 21$ to $\lambda 2n$ (second band), . . . , $\lambda n1$ to $\lambda nn$ (n-th band) with a predetermined gain.

The light signals of the first to n-th bands amplified en bloc as described above are then demultiplexed or separated into the respective bands and undergone proper attenuation through the adjustable optical attenuators 3a; 3b, respectively, whereon the individual light signals are amplified by the first to n-th fixed-gain optical amplifiers (#1, ..., #n) each having a high fixed gain in the respective bands to be subsequently multiplexed by the optical multiplexer 7 and then sent out onto the transmission line. The adjustable optical attenuators 3a; 3b (#1, ..., #n) are employed for the purpose of compensating for deviations from the prescribed value of loss brought about during transmission through an optical fiber connected to the input port of the optical amplifying repeater apparatus, as described hereinbefore in conjunction with the first embodiment of the invention.

More specifically, when the loss in the optical fiber connected to the input port of the optical amplifying repeater apparatus is smaller than the prescribed value by D [dB], the attenuation factor of the adjustable optical attenuators 3a; 3b, respectively, are set to D [dB]. In this conjunction, it is noted that in case the wavelength ranges of the bands #1, ..., #n are wide, there may arise such situation that the attenuation factors to be set for the adjustable optical attenuator factors 3a; 3b (#1, ..., #n), respectively, differ from one to another because the loss brought about during transmission through the optical fiber connected to the input port of the optical amplifying repeater apparatus will exhibit dependency on the wavelengths. Accordingly, in the case of the optical amplifying repeater apparatus according to the second embodiment of the invention, there are provided the adjustable optical attenuators 3a; 3b (#1, ..., #n) in correspondence to the discrete bands (#1, ..., #n), respectively.

The monitoring light branching devices 5a; 5b (#1, ..., #n) are each so designed as to extract specific monitoring light signals, e.g. parts of light power of the wavelengths $\lambda 1n, ..., \lambda nn$, which are then fed to the adjustable attenuator control circuits 6a; 6b (#1, ..., #n), respectively. The adjustable attenuator control circuits 6a; 6b control the attenuation factors of the associated adjustable optical attenuators 3a; 3b (#1, ..., #n), respectively, so that the light powers of the specific wavelengths $\lambda 1n, ..., \lambda nn$ remain constant. Through the operation mentioned above, the gains of the optical amplifying repeater apparatus for the monitoring light wavelengths $\lambda 1n, ..., \lambda nn$ in the specific band can be determined. Thus, by employing as the optical amplifying medium a substantially homogeneous medium such as a semiconductor amplifier, an optical fiber doped with rare-earth element(s) or the like, the gains for the other wavelengths can be fixed. Thus, there can be implemented the optical amplifying repeater apparatus whose gain is essentially insusceptible to the change in the number of the wavelengths.

Embodiment 3

Figure 3:
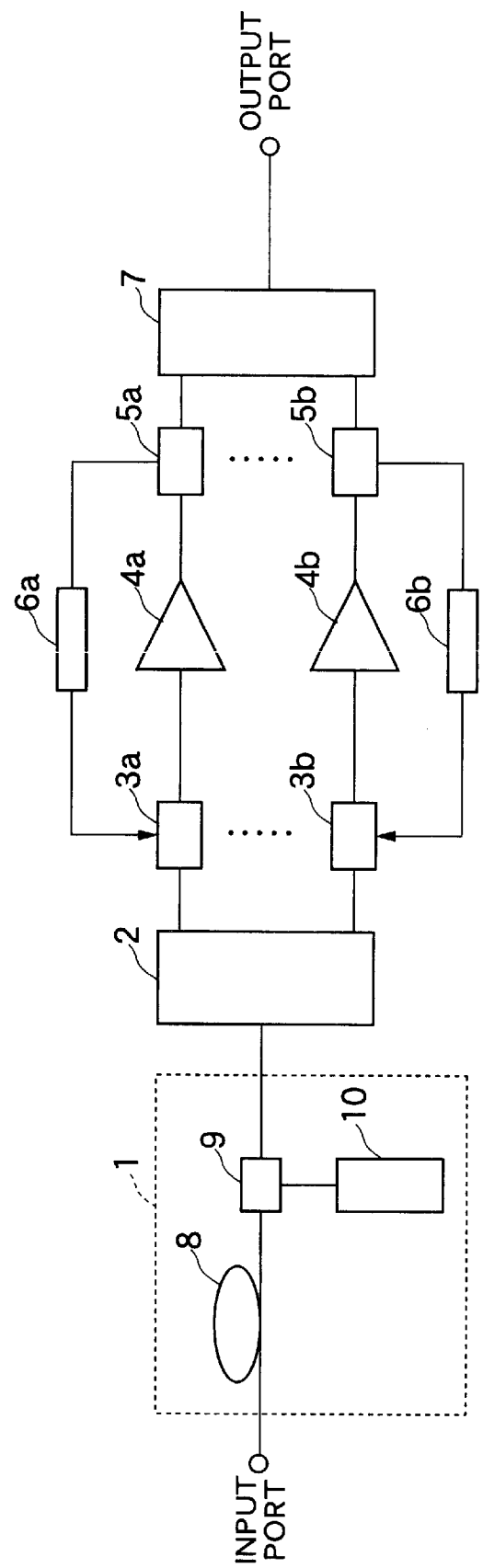
FIG. 3 is a block diagram showing a structure of an optical amplifying repeater apparatus according to a third embodiment of the invention.

FIG. 3 is a block diagram showing a configuration or structure of an optical amplifying repeater apparatus according to a third embodiment of the invention. In FIG. 3, reference numeral 8 denotes an optical fiber, numeral 9 denotes an optical coupling device and reference numeral 10 denotes a pumping light source. In the figure, components same as or equivalent to those of the optical amplifying repeater apparatus described previous by reference to FIG. 2 are denoted by like reference symbols, and description thereof is omitted.

Operation of the optical amplifying repeater apparatus according to the instant embodiment will be described. In the optical amplifying repeater apparatus now under consideration, the pumping light source 10 sends out pumping light injected to the optical fiber 8 by way of the optical coupling device 9 for effectuating the stimulated Raman amplification. Since the stimulated Raman amplifier is difficult to be subjected to gain saturation when compared with the semiconductor amplifier and the optical fiber doped with rare-earth element(s) and is capable of performing substantially linear operation up to the output power substantially equal to the pumping light power, the stimulated Raman amplifier is the most suitable amplifying medium to be used as the first fixed-gain optical amplifier. Thus, ideal operation of the first fixed-gain optical amplifier 1 can be realized. Operations of the other components shown in FIG. 3 are similar to those of the optical amplifying repeater apparatus described hereinbefore in conjunction with the second embodiment of the invention.

Embodiment 4

The optical amplifying repeater apparatus according to the instant embodiment of the invention is implemented in substantially same structure as that of the third embodiment.

Accordingly, repetitive description will be unnecessary. It should however be mentioned that the optical amplifying repeater apparatus according to the instant embodiment differ from the third embodiment in respect to the pumping light source 10.

Operation of the optical amplifying repeater apparatus according to the instant embodiment will be described. According to the teaching of the invention incarnated in the instant embodiment, the pumping light source 10 of sufficiently high rated power is employed so that the optical fiber 8 doped with rare-earth(s) or transition metal(s) is capable of performing amplifying operation in the unsaturated region under the effect of the stimulated emission in the wavelength bands of plural wavelength-multiplexed light signals. The optical multiplexer 7 serves for optically coupling the plural wavelength-multiplexed light signals mentioned above with the output of the pumping light source 10. In this manner, by using the pumping light source 10 of sufficiently high output power, the gain of the optical amplifying repeater apparatus can be maintained to be essentially constant.

Embodiment 5

Figure 4:
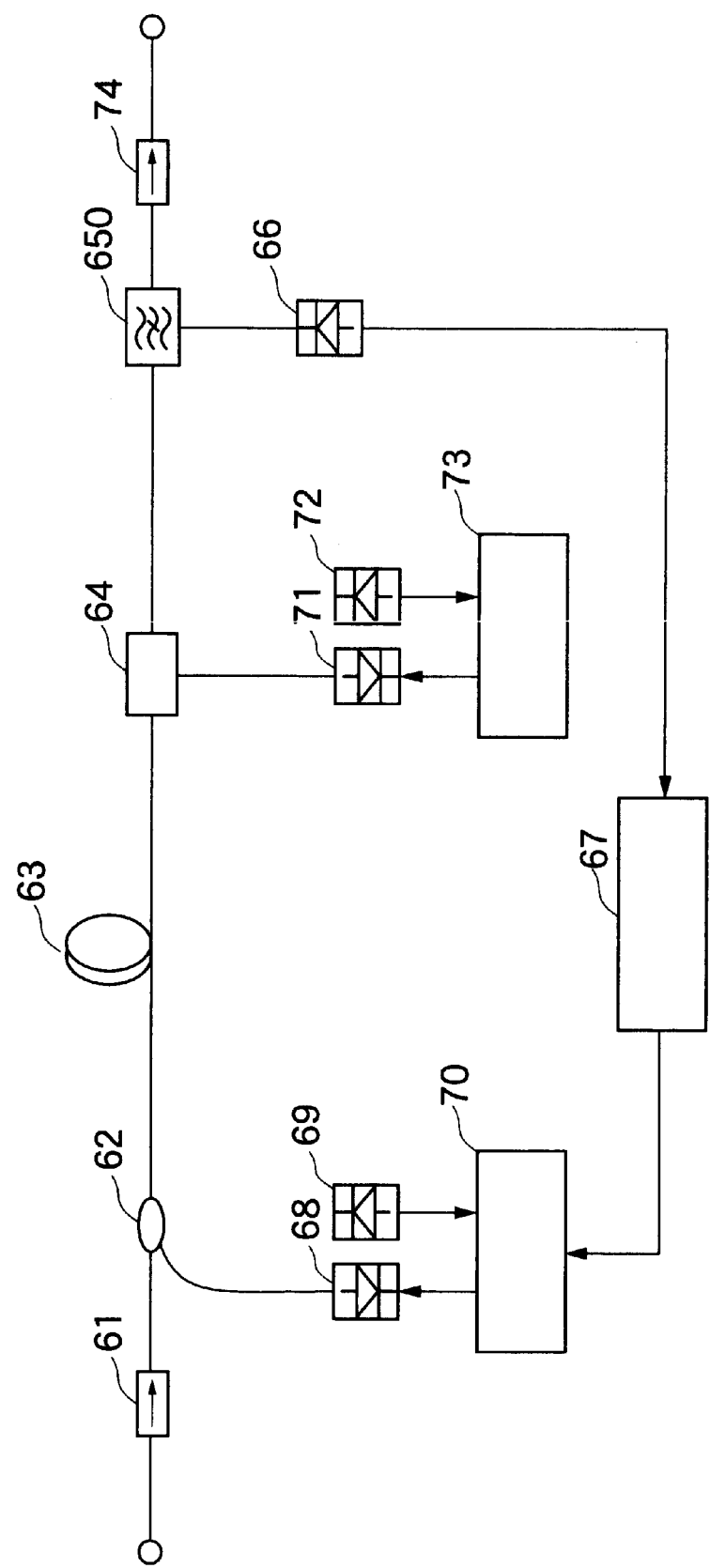
FIG. 4 is a block diagram showing a structure of an optical amplifying repeater apparatus according to a fifth embodiment of the invention.

FIG. 4 is a block diagram showing a configuration of an optical amplifying repeater apparatus according to a fourth embodiment of the invention. More specifically, this figure shows an exemplary structure of the fixed-gain optical amplifier #1, ..., #n. In FIG. 4, reference numeral 61 denotes an optical isolator, numeral 62 denotes an optical coupling device serving as a compensating light coupling device, numeral 63 denotes an optical fiber doped with rare-earth element(s) or transition metal(s) (hereinafter referred to as the doped fiber), numeral 64 denotes an optical coupling device, numeral 650 denotes an optical filter serving as a compensating light branching device for extracting the compensating light, numeral 66 denotes a photodetector, numeral 67 denotes a compensating light control circuit, numeral 68 denotes a compensating light source, numeral 69 denotes a compensating light monitoring element, numeral 70 denotes a compensating light source driving circuit, numeral 71 denotes a pumping light source, numeral 72 denotes a pumping light monitoring element, and reference numeral 73 denotes a pumping light source driving circuit.

Parenthetically, it is to be added that the doped fiber 63, the optical coupling device 64 and the pumping light source 71 cooperate to constitute an optical amplifying unit.

Next, description will turn to operation of the apparatus. The doped fiber employed most conveniently as the fixed-gain optical amplifier #1, . . . , #n is likely to be saturated in the gain. Accordingly, in case the doped fiber is used as the fixed-gain optical amplifier, some auxiliary circuit will have to be provided in association with the fixed-gain optical amplifier implemented by using the doped fiber. Referring to the figure, the doped fiber 63 is supplied with pumping light of a constant level from the optical multiplexer 7 through the medium of the optical coupling device 64. Operation for maintaining the pumping light at a constant level can easily be achieved by monitoring the output power of the pumping light source by means of the pumping light monitoring element 72 and controlling appropriately the level of the driving current for the pumping light source by means of the pumping light source driving circuit 73.

The compensating light emitted from the compensating light source 68 is injected into the doped fiber 63 through the optical coupling device 62. The compensating light branching device 650 serves for extracting or filtering out the amplified compensating light outputted from the doped fiber 63, wherein the output of the compensating light branching device is supplied to the photodetector 66. The output of the photodetector 66 in turn is fed to the compensating light control circuit 67 for the purpose of controlling the compensating light source driving circuit 70 so that the ratio between the monitored level outputted from the compensating light monitoring element 69 and that of the photodetector 66 remains constant. Through the operation described above, the gain of the fixed-gain optical amplifiers #1, . . . , #n at the wavelength of the compensating light can be regulated to be constant. Thus, for the fixed-gain optical amplifier 1 having the homogeneous characteristics, constant gain can be ensured for all the wavelength bands for amplification.

Embodiment 6

Figure 5:
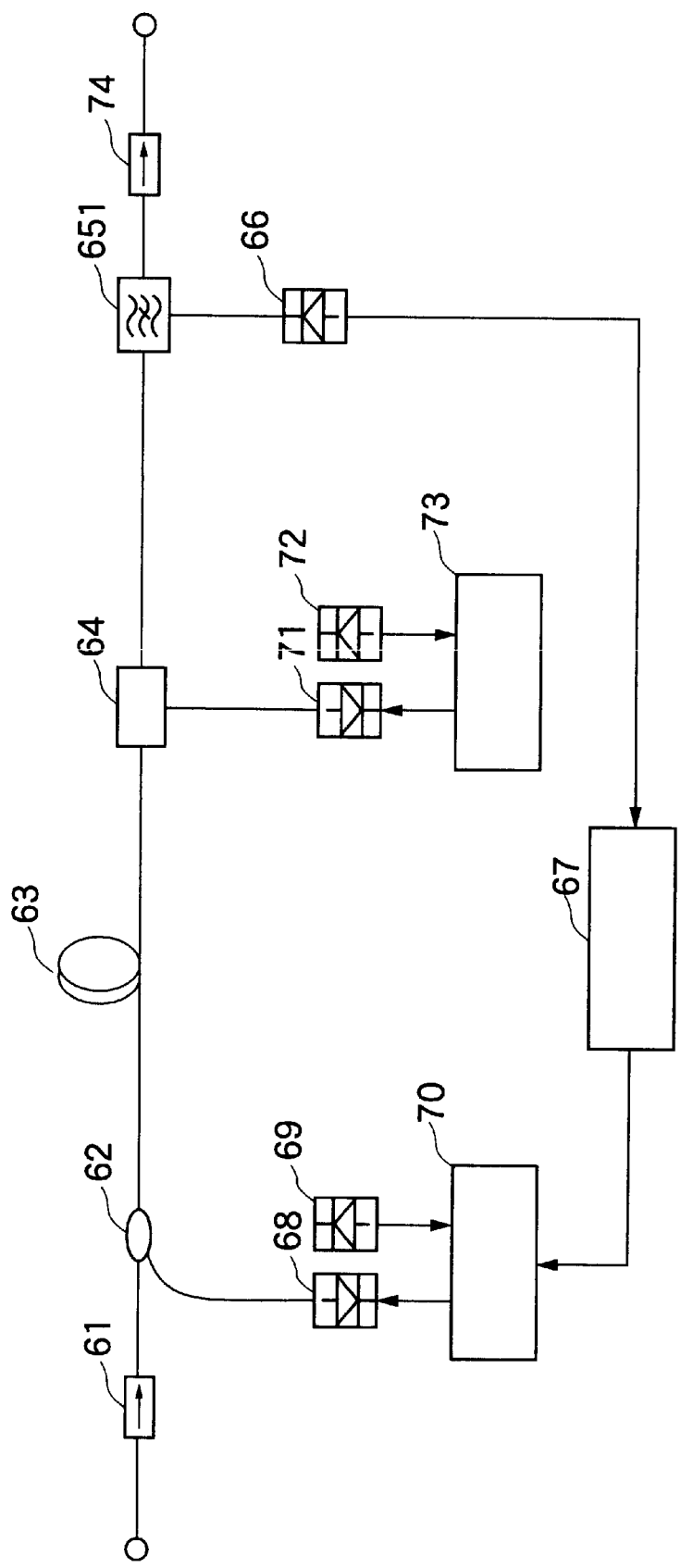
FIG. 5 is a block diagram showing a structure of an optical amplifying repeater apparatus according to a sixth embodiment of the invention.

FIG. 5 is a block diagram showing a configuration of an optical amplifying repeater apparatus according to a sixth embodiment of the invention. More specifically, this figure shows an exemplary structure of the fixed-gain optical amplifier #1, . . . , or #n. In FIG. 5, reference numeral 651 denotes an optical filter for extracting or filtering out spontaneously emitted light from the doped fiber in a predetermined wavelength band. Incidentally, in FIG. 5, components same as or equivalent to those mentioned hereinbefore in conjunction with the optical amplifying repeater apparatus shown in FIG. 4 are denoted by like reference symbols and description thereof is omitted.

In operation, the optical filter 651 filters out the spontaneously emitted light from the doped fiber 63 in a predetermined wavelength band, the output of the optical filter 651 being inputted to the photodetector 66. In the case of the fixed-gain optical amplifier according to the instant embodiment, the compensating light control circuit 67 is so designed as to control the compensating light source driving circuit 70 so that the output of the photodetector 66 is maintained to be constant. In general, the gain of the doped fiber 63 is in proportion to the power of spontaneously emitted light. Thus, with the arrangement described above, constant gain can be ensured independently of the number of the signal wavelengths injected or inputted to the doped fiber 63.

Embodiment 7

Figure 6:
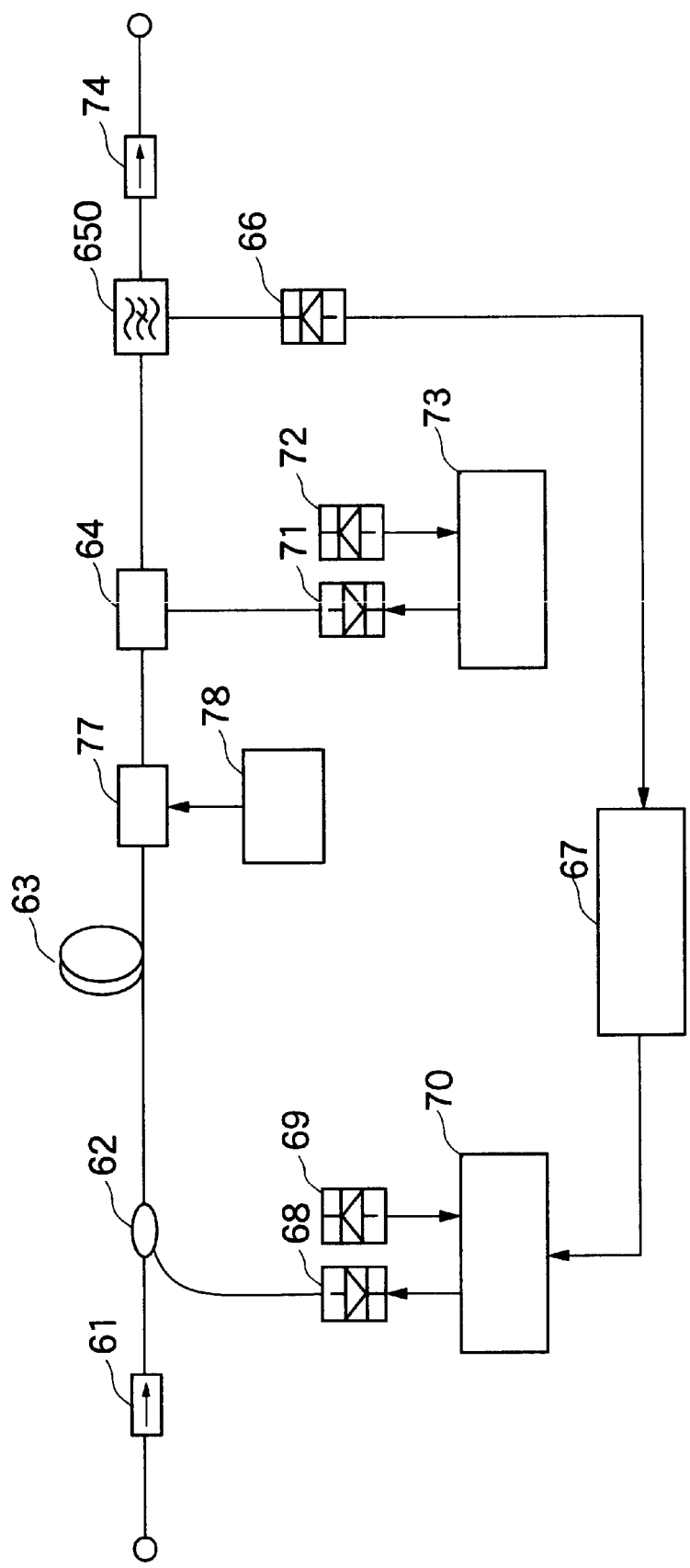
FIG. 6 is a block diagram showing a structure of an optical amplifying repeater apparatus according to a seventh embodiment of the invention.

FIG. 6 is a block diagram showing a configuration of the optical amplifying repeater apparatus according to a seventh embodiment of the invention. More specifically, this figure shows an exemplary structure of the fixed-gain optical amplifier #n. In FIG. 6, reference numeral 77 denotes adjustable attenuator and numeral 78 denotes an adjustable attenuator control circuit. In FIG. 6, components same as or equivalent to those mentioned hereinbefore in conjunction with the optical amplifying repeater apparatus shown in FIG. 4 are denoted by like reference symbols and description thereof is omitted.

Figure 7:
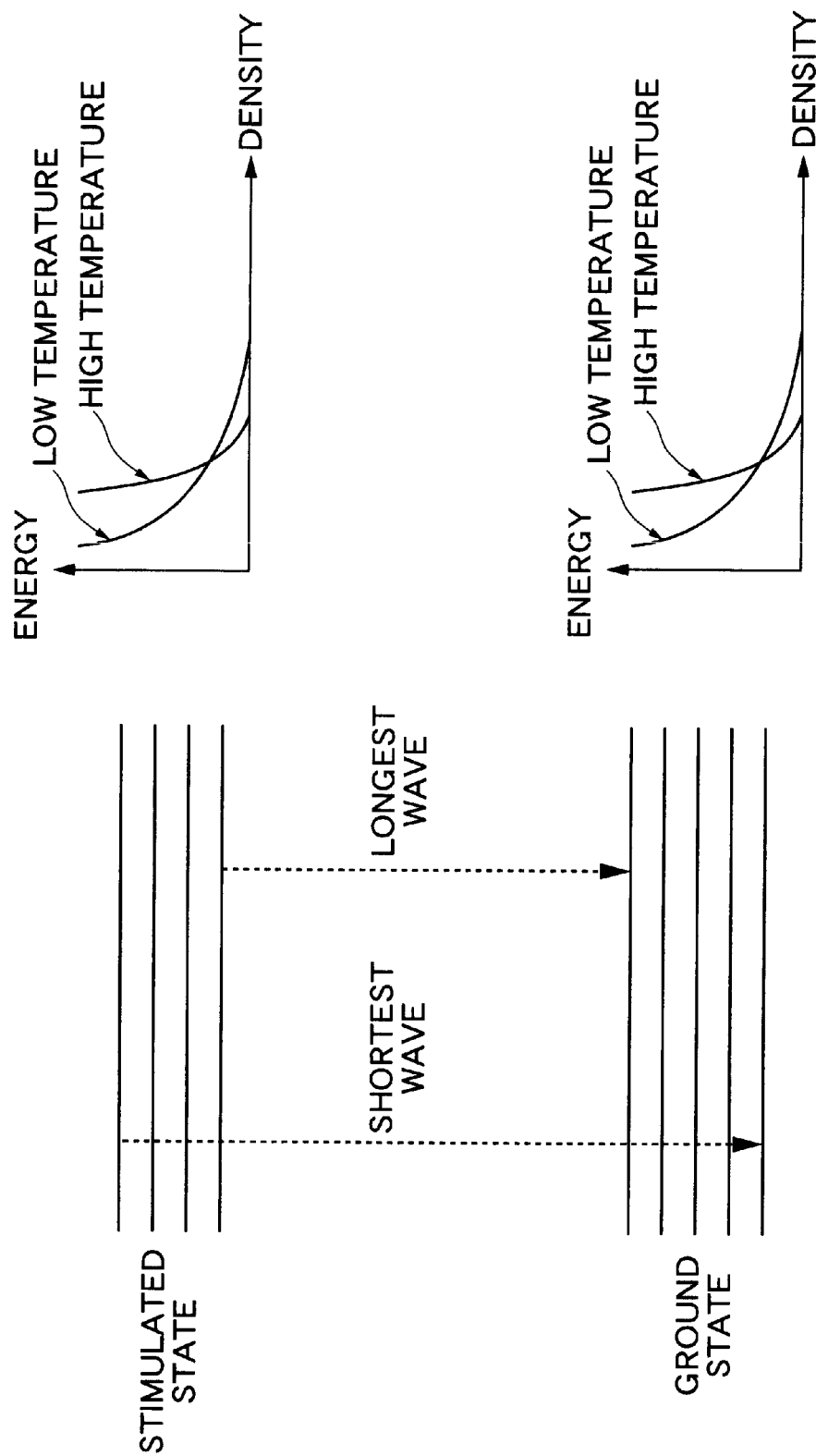
FIG. 7 is a view for illustrating energy levels of a doped fiber.

FIG. 7 is an energy level diagram of a doped fiber. At first, description will be made of the temperature dependence characteristic(s) of the gain of the doped fiber 63. The gain of the doped fiber is in proportion to density difference between the pumped or stimulated state or level at which the laser transition takes place and the ground state level. In general, the stimulated state level and the ground state level can each be divided finely into sublevels in view of the Stark effect.

Referring to FIG. 7, the temperature dependency of the gain for the longest wave is considered. The gain for the longest wave is determined by the density difference between the lowest energy sublevel in the pumped or excited state and the highest energy sublevel in the ground state. Since the density distribution between these sublevels is determined by the Boltzmann's distribution, the gain for the longest wave is low when temperature is high while it is high when the temperature is low. Thus, the temperature dependency of the gain-wavelength characteristic becomes remarkable for the longest wave in a given band.

Turning back to FIG. 6, with a view to compensating for the temperature dependency of the gain described above, the adjustable attenuator control circuit 78 is designed to control the attenuation factor of the adjustable attenuator 77 such that it is set to a small value at a high temperature while being set to a large value at a low temperature. As a result of this, the gain of the doped fiber 63 for the longest wave decreases as the temperature increases while the former increases as the latter decreases, whereby the gain-wavelength characteristic in the longest wave region can be maintained to be substantially constant. Besides, the absolute value of the gain can be held essentially constant.

Embodiment 8

Figure 8:
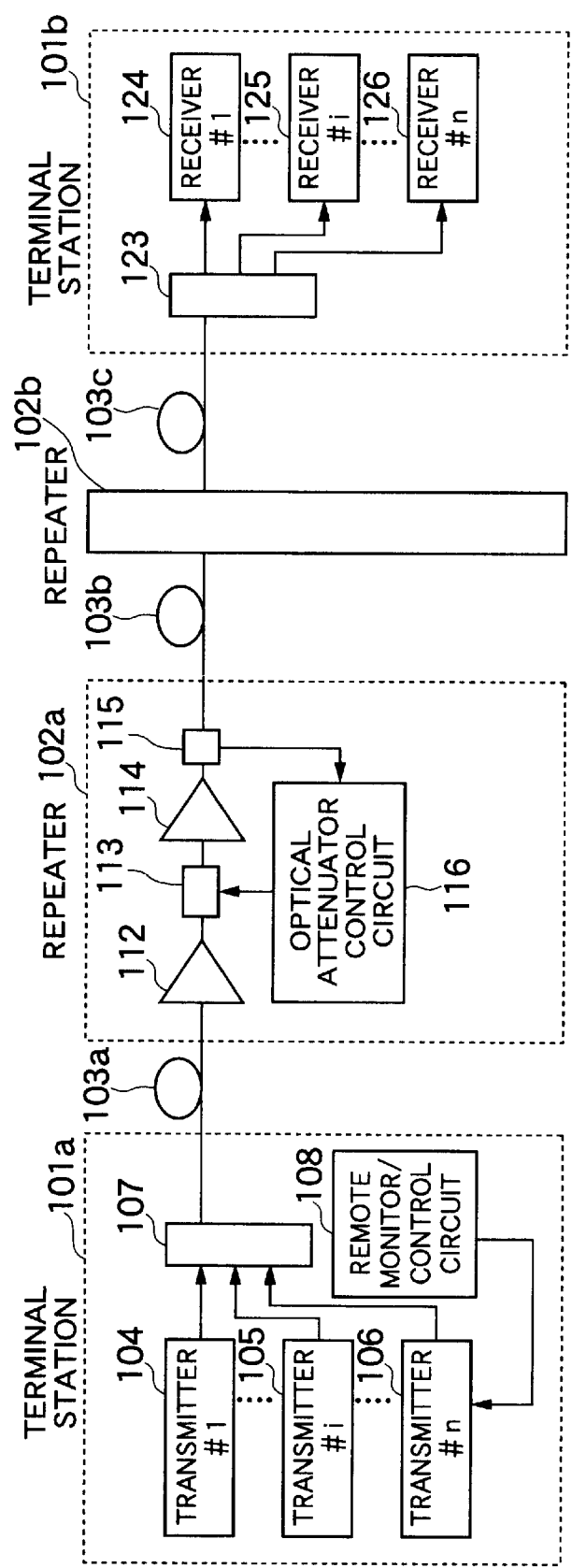
FIG. 8 is a block diagram showing a configuration or structure of an optical amplifying/repeating transmission system according to an eighth embodiment of the invention.

FIG. 8 is a block diagram showing a configuration of an optical amplifying/repeating transmission system according to an eighth embodiment of the invention. In FIG. 8, reference numerals 101a; 101b denote terminal stations, numerals 102a; 102b denote optical repeaters, respectively, numerals 103a, . . . , 103c denote optical fibers, respectively, numerals 104, . . . , 106 denote senders or transmitters, respectively, numeral 107 denotes an optical multiplexer, numeral 108 denotes a remote monitor/control circuit serving as a control signal generating means or a control signal superposing means, numerals 112; 114 denote fixed-gain optical amplifiers, respectively, numeral 113 denotes an adjustable optical attenuator, numeral 115 denotes an optical filter or optical branching device serving as a control signal level detecting means, numeral 116 denotes an adjustable optical attenuator control circuit serving as an optical repeater gain control means, numeral 123 denotes an optical demultiplexer, and reference numerals 124, . . . , 126 denote receiving equipment or receivers.

Next, description will turn to operation of the optical amplifying/repeating transmission system. At the terminal station 101a, a plurality of transmitters 104, . . . , 106 serve for converting the information to be transmitted into light signals λ1, ..., λn, which then undergo wavelength-multiplexing operation through the optical multiplexer 107 to be sent out onto the optical fiber 103a. The remote monitor/control circuit 108 serves to modulate the light intensity of the output of the transmitter 106 with a specific frequency fs. To this end, the modulation factor (percentage modulation) is ordinarily set at several percent or lower so that no adverse influence is executed to the input port. At the optical repeater 102a, the received wavelength-multiplexed signal is first amplified by the fixed-gain optical amplifier 112 with a predetermined gain G0 and thereafter attenuated by the adjustable optical attenuator 113 with a predetermined factor L, whereon the wavelength-multiplexed signal outputted from the adjustable optical attenuator is again amplified by the fixed-gain optical amplifier 114 with a predetermined gain G1.

The attenuation factor L is determined as follows. The optical filter 115 extracts a part of the power of the wavelength λn from the amplified wavelength-multiplexed signal, the output of the optical filter being inputted to the adjustable optical attenuator control circuit 116, which responds thereto by controlling the attenuation factor L of the adjustable optical attenuator 113 so that the power of the frequency fs contained in the extracted power of the wavelength λn becomes constant. In this way, the repeater gain for the wavelength λn can be maintained constant independently of the number of wavelengths. In general, the optical amplifying medium employed for amplifying the wavelength-multiplexed light signal such as e.g. the optical fiber amplifier doped with rare-earth element(s), semiconductor optical amplifier or the like exhibits homogeneous characteristics. This means that the gain fixed for a given wavelength is also fixed for the other wavelengths. Thus, there can be realized stable amplification characteristics which exhibit no dependency on the number of wavelengths.

In the case of the optical amplifying/repeating transmission system according to the instant embodiment of the invention, the remote monitor/control circuit 108 which serves as the control signal generating means is designed to generate the control signal by modulating the light intensity outputted from the transmitter 106. It should however be understood that the remote monitor/control circuit 108 may be so arranged as to generate a control signal of a specific frequency and superpose it on a given one of the plural light signals (control signal superposing means).

Embodiment 9

Figure 9:
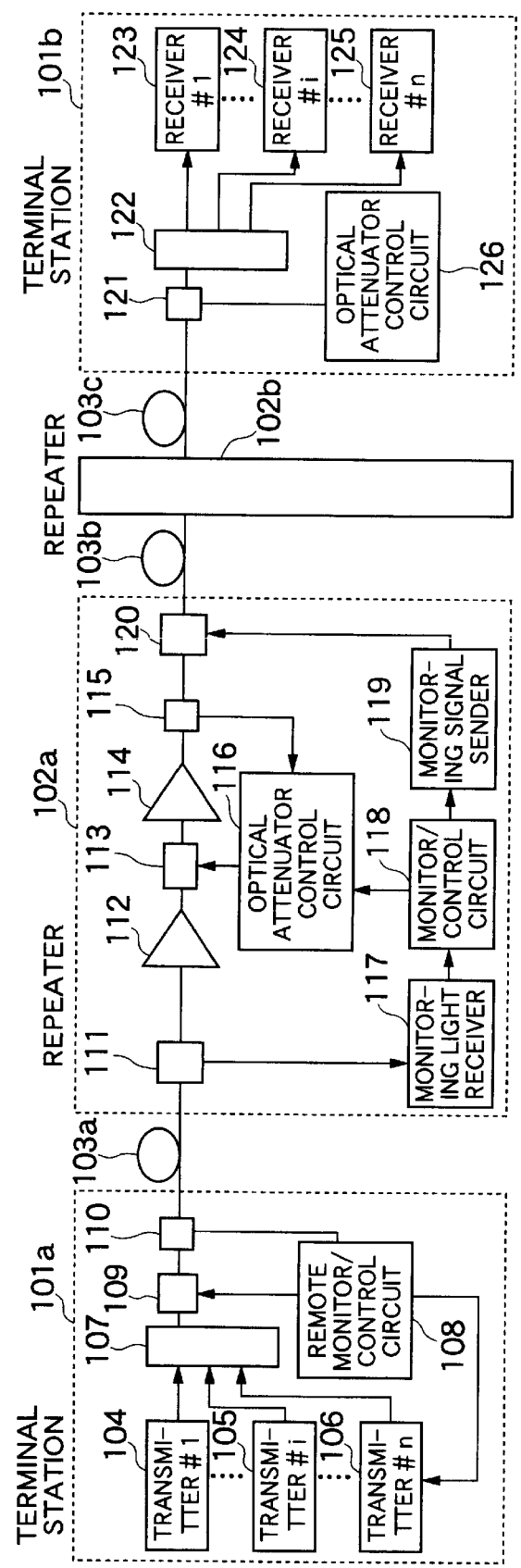
FIG. 9 is a block diagram showing a structure of an optical amplifying/repeating transmission system according to a ninth embodiment of the invention.

FIG. 9 is a block diagram showing a configuration of an optical amplifying/repeating transmission system according to a ninth embodiment of the invention. In FIG. 8, reference numeral 108 denotes a remote monitor/control circuit, numeral 109 denotes an optical coupling device, numeral 110 denotes an optical branching device, numeral 111 denotes a light signal branching device, numeral 118 denotes a monitor/control circuit, numeral 119 denotes a monitoring signal sender, numeral 120 denotes an optical coupling device, numeral 121 denotes an optical branching device, and reference numeral 126 denotes an optical attenuator control circuit).

Operation of the optical amplifying/repeating transmission system will now be described. The remote monitor/control circuit 108 serves not only for modulation of the light signal intensity outputted from the transmitter 106 with the frequency fs but also for measuring the power of the light signal of wavelength λn contained in the wavelength-multiplexed signal and branched by the optical branching device 110, to thereby superpose the information carried by the light signal of the wavelength λn on the monitoring light signal λs. Thus, the remote monitor/control circuit of the optical amplifying/repeating transmission system according to the instant embodiment of the invention serves not only as the control signal generating means but also as the control signal superposing means and the monitor signal transmitting means. The optical coupling device 109 is designed to multiplex the monitoring light signal λs with the light signals with low loss. In the optical repeater 102a, monitoring light signal )s is extracted through the light signal branching device 111 and received by the optical repeater gain control means to be subsequently supplied to the monitor control/circuit 118, which in turn is so designed as to control operation of the gain control system which is constituted by the adjustable optical attenuator 113 and the adjustable optical attenuator control circuit 116. More specifically, the monitor/control circuit allows operation of the gain control system so long as the power of the light signal of wavelength λn is normal while suspending the operation of the gain control system by holding the attenuation factor of the adjustable optical attenuator 113 to be constant when the power of the wavelength λn is abnormal. By virtue of this arrangement, the gain of the optical repeater 102a is prevented from being set to an erroneous value even when the power of the light signal of wavelength λn lowers due to so-called age deterioration or the like cause.

Embodiment 10

The frequency fs with which the light signal intensity outputted from the transmitter 106 is modulated by the remote monitor/control circuit 108 should be set to a large value at which variation in the gain of the fixed-gain optical amplifiers 112; 114 does not occur. More specifically, in the case of the optical fiber doped with rare-earth element(s) used conventionally as the optical amplifying medium in which erbium is employed as the laser medium, the life of light quantum or photon is 10 s. Accordingly, it is sufficient to set the frequency f0 at several tens kHz or higher. Thus, according to the teaching of the invention incarnated in the tenth embodiment, the frequency fs is set at 100 kHz or higher in order to ensure stable amplification characteristics for the fixed-gain optical amplifier 112; 114 by preventing variation of the gains of these amplifiers.

Embodiment 11

In conjunction with the tenth embodiment, description has been made as to the measure for coping with such situation that the power of light signal of wavelength λn employed as the control light for controlling the gain of the optical repeater becomes anomalous. On the other hand, it is also conceivable that the light signal of the wavelength λn is suddenly interrupted for some reason. In that case, there arises necessity of messaging the sudden interruption even to the terminal stations 101a and 101b with the monitoring light signal As before the light signal of wavelength λn interrupted reaches at the terminal stations. In this conjunction, it is noted that the optical fibers 103a, ..., 103c present a group speed which differs in dependence on the wavelengths. By way of example, a light signal of 1.3 μm in wavelength propagates more speedily that a light signal of 1.55 μm in wavelength by 2.2 ns per kilometer. Accordingly, by setting the wavelength of the monitoring light signal to e.g. 1.3 μm which is shorter than that of light signal used ordinarily whose wavelength is 1.15 μm, the operating state control of the gain control system can be performed owing to the availability of the monitoring light signal λs even in the event that the power of wavelength λn is interrupted for some reason.

Embodiment 12

Figure 10:
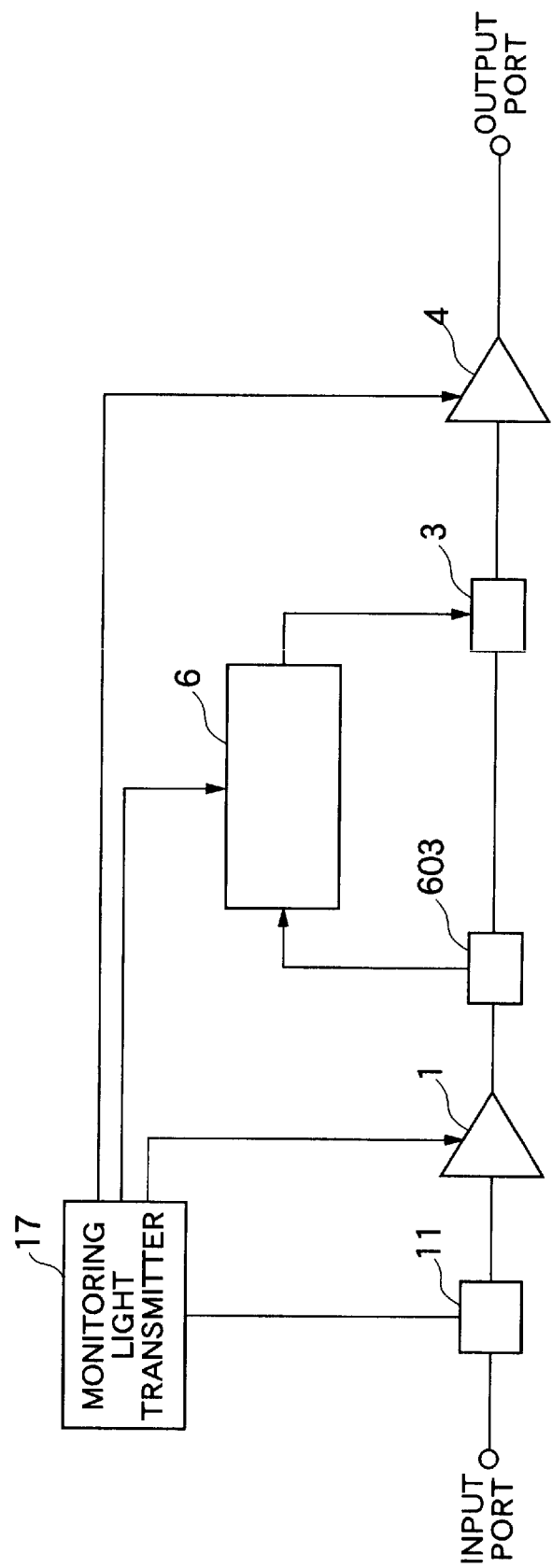
FIG. 10 is a block diagram showing a structure of an optical amplifying repeater apparatus according to a twelfth embodiment of the invention.

FIG. 10 is a block diagram showing a configuration of an optical amplifying repeater apparatus according to a twelfth embodiment of the invention. In FIG. 10, reference numeral 603 denotes a control light signal branching device for extracting a part of the power of a control light signal employed for controlling the gain of the optical amplifying repeater apparatus.

Operation of the optical amplifying repeater apparatus according to the instant embodiment of the invention will be described. The inputted wavelength-multiplexed signals λ1; λn are first amplified by the first fixed-gain optical amplifier 1 with a predetermined gain G0 to be subsequently inputted to the control light signal branching device 603, which is designed to extract a part of the power of the control light λc. Major parts of the powers of the light signals of the other wavelengths and that of the control light λc are inputted to the adjustable optical attenuator 3 with low loss. On the other hand, the adjustable attenuator control circuit 6 is designed to control the attenuation factor of the adjustable optical attenuator 3 so that the power outputted from the control light signal branching device 603 remains constant. The wavelength-multiplexed-light signals λ1; λn outputted from the adjustable optical attenuator 3 are again amplified by the second fixed-gain optical amplifier 4 with a constant gain G1. Through the operation described above, the gain of the optical amplifying repeater apparatus for a specific wavelength can be determined. Thus, by using a substantially homogeneous medium such as the semiconductor amplifier, the optical fiber doped with rare-earth element(s) or the like as the optical amplifying medium, the gain for the other wavelengths is fixed. In other words, there can be realized the optical amplifying repeater apparatus having the gain which is independent of change of the number of wavelengths.

The monitor/control circuit 17 plays the roll described below. When the power of the received light signal becomes lower than a predetermined value, the monitor/control circuit 17 stops the amplifying action of the first fixed-gain optical amplifier 1 and the second fixed-gain optical amplifier 4 while suppressing surge phenomenon which takes place upon recovery of the received signal.

Embodiment 13

Figure 11:
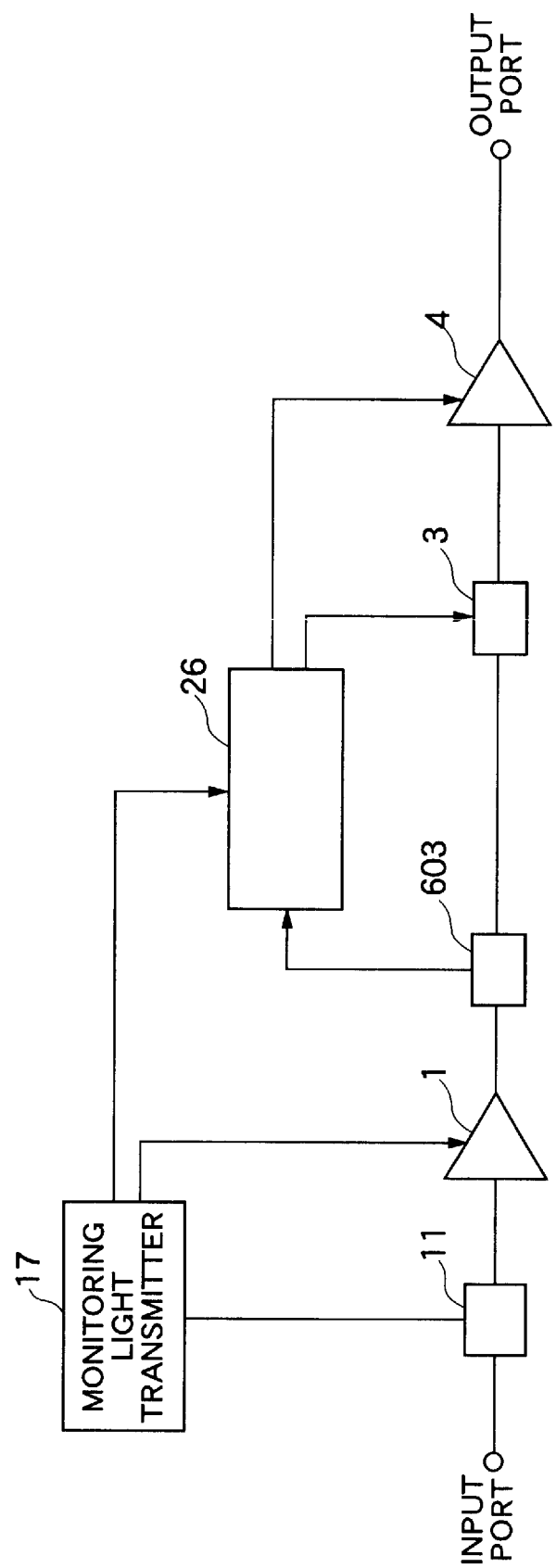
FIG. 11 is a block diagram showing a structure of an optical amplifying repeater apparatus according to a thirteenth embodiment of the invention.
Figure 12:
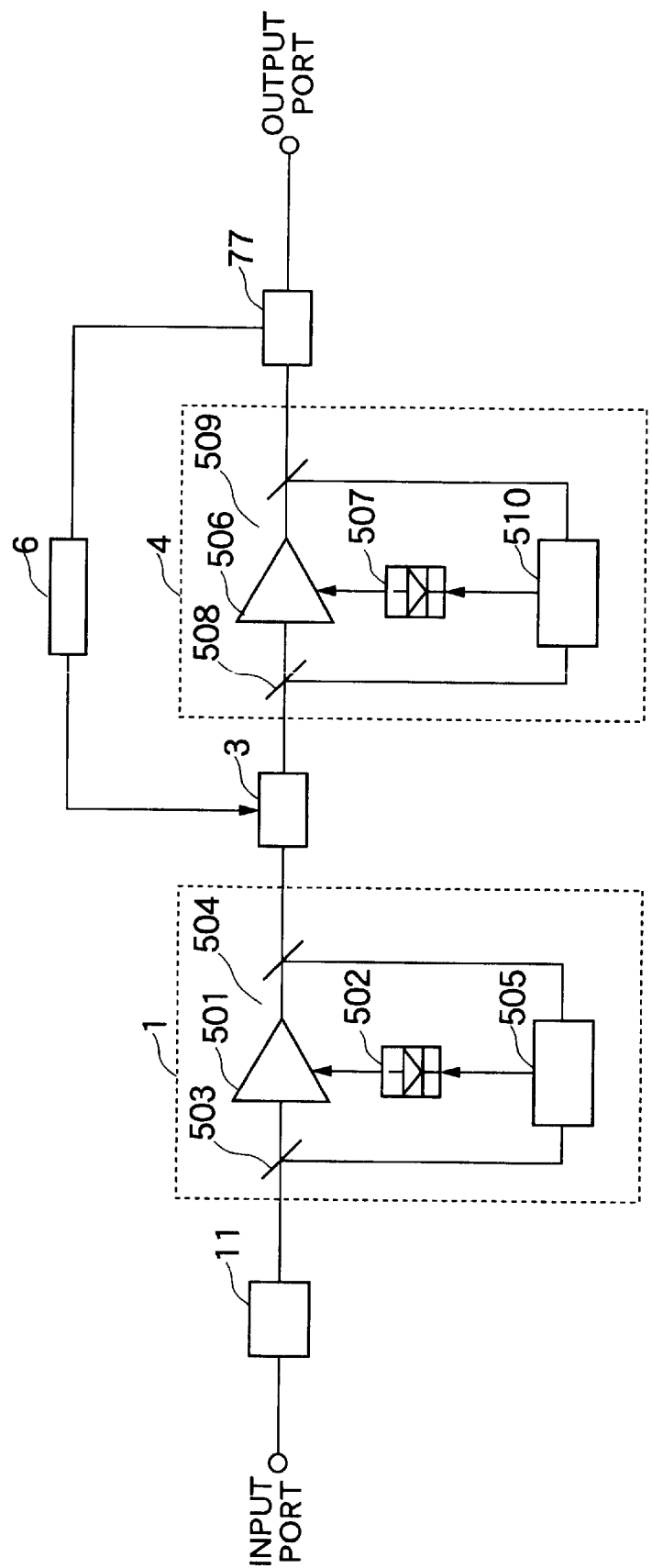
FIG. 12 is a block diagram showing a structure of a conventional optical amplifying repeater apparatus known heretofore.
Figure 13:
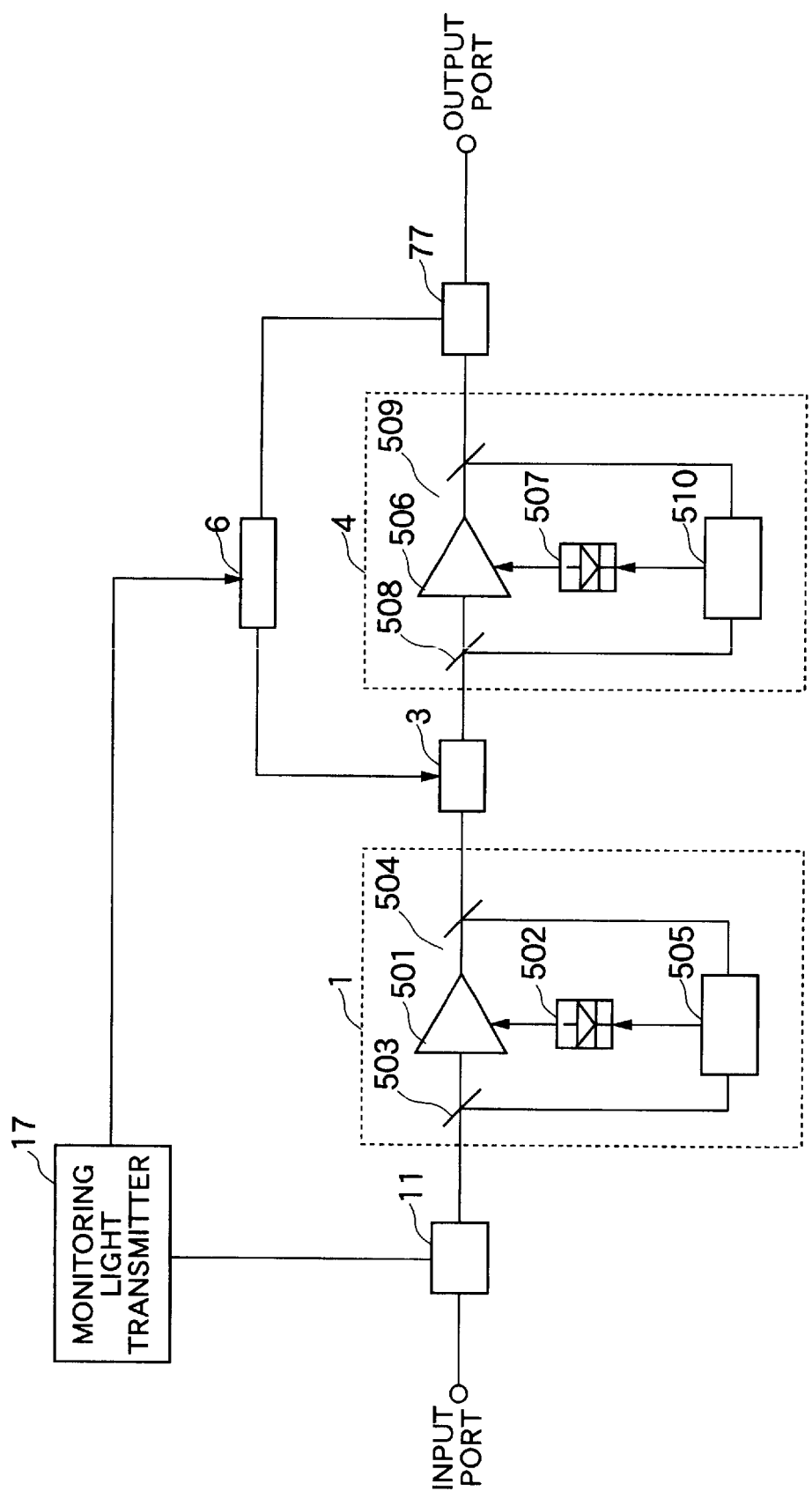
FIG. 13 is a block diagram showing a structure of another conventional optical amplifying repeater apparatus.

FIG. 11 is a block diagram showing a configuration of an optical amplifying repeater apparatus according to a thirteenth embodiment of the invention. In FIG. 11, reference numeral 26 denotes an optical attenuator control circuit designed to serve also as the output break circuit. In the case of the optical amplifying repeater apparatus according to the instant embodiment of the invention, the optical attenuator control circuit 26 is also imparted with the function for controlling the amplifying action of the second fixed-gain optical amplifier 4.

In operation of the optical amplifying repeater apparatus, the optical attenuator control circuit 26 serves not only for controlling the attenuation factor of the adjustable optical attenuator 3 so that the power outputted from the control light signalbranchingdevice 603 is constantbut also forstopping the amplification operation of the second fixed-gain optical amplifier 4 when the power outputted from the control light signal branching device 603 becomes lower than a predetermined level (output break circuit). By virtue of this function, it is possible to prevent the output power of the second fixed-gain optical amplifier 4 from increasing abnormally even when the control light is interrupted for some cause.

INDUSTRIAL APPLICABILITY

The optical amplifying repeater apparatus according the present invention includes an input port to which a plurality of light signals multiplexed in wavelength are inputted, a first fixed-gain optical amplifier for amplifying the wavelength-multiplexed light signals inputted through the input port with a predetermined gain, an adjustable optical attenuator for attenuating the wavelength-multiplexed light signals by a predetermined factor after amplification through the first fixed-gain optical amplifier, an optical demultiplexer for demultiplexing the wavelength-multiplexed light signals outputted from the adjustable optical attenuator into a plurality of individual light signals of discrete wavelengths, respectively, fixed-gain optical amplifiers #1; #n for amplifying the plurality of individual wavelength-demultiplexed light signals outputted from the optical demultiplexer with a predetermined gain, a monitoring light branching device connected to one of outputs of the second fixed-gain optical amplifiers #1; #n for extracting a part of a specific monitoring light signal, an optical multiplexer for multiplexing the individual light signals outputted from the second fixed-gain optical amplifiers #1; #n, respectively, for thereby outputting multiplexed light signals, and an adjustable attenuator control circuit for detecting output power of the monitoring light branching device to thereby control the attenuation factor of the optical attenuator so that the detected output power assumes a constant value. By virtue of the arrangement described above, there can be provided the optical amplifying repeater apparatus whose gain exhibits essentially no dependency on the change of the number of wavelengths. In other words, the optical amplifying repeater apparatus having the communication quality which is essentially insusceptible to the change in the number of the wavelengths can be realized. In the optical amplifying repeater apparatus described above, there may be adopted such a system in which a tone signal of a specific frequency is superposed on the monitoring light, wherein the tone signal is extracted in the optical attenuator control circuit for the purpose of eliminating the influence of noise.

Further, the optical amplifying repeater apparatus according to the present invention includes an input port to which a plurality of light signals multiplexed in wavelength are inputted, a first fixed-gain optical amplifier for amplifying the wavelength-multiplexed light signals inputted through the input port with a predetermined gain, an optical demultiplexer connected to output of the first fixed-gain optical amplifier for demultiplexing the wavelength-multiplexed light signals into a plurality of individual light signals of respective wavelengths, adjustable optical attenuators #1; #n for attenuating the outputs of the optical demultiplexers, respectively, by a predetermined factor, fixed-gain optical amplifiers #1; #n for amplifying the plurality of light signals outputted from the adjustable optical attenuators with a predetermined gain, monitoring light branching devices connected to outputs of the fixed-gain optical amplifiers #1; #n for extracting parts of specific monitoring light signals #1; #n, respectively, an optical multiplexer for multiplexing the outputs of the fixed-gain optical amplifiers #1; #n to thereby output multiplexed light signals, and adjustable attenuator control circuits #1; #n for detecting output powers of the monitoring light branching devices to thereby control the attenuation factor of the optical attenuators so that each of the detected output powers assumes a constant value. Owing to the arrangement described above, the gains of the optical amplifying repeater apparatus for the monitoring light wavelengths λ1n, . . . , λnn in the specific band can be determined. Thus, by employing as the optical amplifying medium a substantially homogeneous medium such as a semiconductor amplifier, an optical fiber doped with a rare-earth element or the like, the gains for the other wavelengths can be fixed, whereby the optical amplifying repeater apparatus whose gain exhibits substantially no dependency on the change in the number of the wavelengths can be realized.

In the optical amplifying repeater apparatus described above, the first fixed-gain optical amplifier includes an optical fiber serving as a transmission line, a pumping light source for inducing stimulated Raman amplifying action internally of the optical fiber in wavelength bands of the plurality of wavelength-multiplexed light signals, and an optical coupling device for coupling the output of the pumping light source with the plurality of wavelength-multiplexed light signals. With the arrangement described above, the pumping light source activating the stimulated Raman amplifying operation is difficult to be subjected to gain saturation when compared with the semiconductor amplifier and the optical fiber doped with a rare-earth element and is capable of performing substantially linear operation up to the output power substantially equal to the pumping light power. In other words, the stimulated Raman amplifier is the most suitable amplifying medium to be used as the first fixed-gain optical amplifier. Thus, ideal operation of the first fixed-gain optical amplifier 1 can be realized.

Further, in the optical amplifying repeater apparatus described above, the first fixed-gain optical amplifier includes an optical fiber doped with a rare-earth element or alternatively a transition metal, a pumping light source for inducing amplifying action under stimulated emission internally of the optical fiber in wavelength bands of the plurality of wavelength-multiplexed light signals, and an optical coupling device for coupling the output of the pumping light source with the plurality of wavelength-multiplexed light signals, wherein the optical fiber doped with the rare-earth element or alternatively the transition metal is operative in an unsaturated region. Thus, by using the pumping light source of sufficiently high output power, constant gain can be ensured for the optical amplifying repeater apparatus independently of the number of the wavelengths as well as variance of loss in the transmission line.

Further, in the optical amplifying repeater apparatuses described above, the fixed-gain optical amplifier #1; #n includes an optical amplifying unit composed of an optical fiber doped with a rare-earth element or alternatively a transition metal and a pumping light source for stimulating the rare-earth element or alternatively the transition metal to thereby bring about stimulated emission, a compensating light source for generating compensating light having a wavelength within an amplified wavelength band of the optical amplifying unit, an compensating light coupling device for coupling the compensating light with the plurality of wavelength-multiplexed light signals, a compensating light branching device for separating mutually the compensating light and the plural wavelength-multiplexed light signals contained in the output of the optical amplifying unit, and a compensating light control circuit for controlling output power of the compensating light source such that ratio between power of the compensating light outputted from the compensating light branching device and power of the compensating light outputted from the compensating light source assumes a predetermined standard value. With the arrangement described above, the gain of the fixed-gain optical amplifiers #1, . . . , #n at the wavelength of the compensating light can be regulated to be constant. Thus, for the doped fiber 1 having homogeneous characteristics, constant gain can be ensured for all the wavelength bands for amplification.

Furthermore, in the optical amplifying repeater apparatuses described above, the fixed-gain optical amplifier #1; #n includes an optical amplifying unit composed of an optical fiber doped with a rare-earth element or alternatively a transition metal and a pumping light source for stimulating the rare-earth element or alternatively the transition metal to thereby bring about stimulated emission, and a compensating light control circuit for controlling output power of the compensating light source such that power of spontaneously emitted light outputted from the optical amplifying unit assumes a predetermined standard value. With the arrangement described above, constant gain can be ensured independently of the number of the signal wavelengths injected or inputted to the optical fiber, since the gain of the optical fiber is in proportion to the power of spontaneously emitted light.

Furthermore, in the optical amplifying repeater apparatuses described above, the fixed-gain optical amplifier #1; #n includes an adjustable optical attenuator #1'; #n' inserted at an input or output side, whereby a means for changing the attenuation factor of the adjustable optical attenuator #1'; #n' in dependence on ambient temperature is implemented. With such arrangement, the gain of the optical fiber for the longest wave decreases as the temperature increases while the former increases as the latter decreases, whereby the gain-wavelength characteristic in the longest wave region can be maintained to be substantially constant. Besides, the absolute value of the gain can be held essentially constant.

Additionally, the optical amplifying/repeating transmission system according to the present invention includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system further includes a control signal superposing means for superposing a control signal of a specific frequency onto one of the plural light signals, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant. Thus, there is realized the optical amplifying/repeating transmission system which can ensure a constant gain independently of the power of the input signal and the number of the wavelengths thereof.

Moreover, the optical amplifying/repeating transmission system according to the present invention includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system further includes a control signal generating means for modulating one of the plural light signals with a control signal of a specific frequency, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant. By virtue of the arrangement described above, there is realized the optical amplifying/repeating transmission system which can ensure a constant gain independently of the power of the input signal and the number of the wavelengths thereof.

Further, the optical amplifying/repeating transmission system according to the present invention includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system includes a control signal superposing means for superposing a control signal of a specific frequency onto one of the plural light signals, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant, a monitor signal transmitting means for supplying transmission level of the control signal to the optical repeater, and a monitor/control means for receiving a monitoring signal supplied from the monitor signal transmitting means to thereby enable the optical repeater gain control means to operate when the level of the control signal is normal while disabling operation of the optical repeater gain control means with the gain thereof being held when the level of the control signal is abnormal. Thus, with the arrangement described above, the monitor/control circuit allows operation of the gain control system so long as the power of the light signal of wavelength $\lambda n$ is normal while suspending the operation of the gain control system by holding the attenuation factor of the adjustable optical attenuator to be constant when the power of the above wavelength is abnormal. By virtue of this feature, the gain of the optical repeater is prevented from being set to an erroneous value even when the power of the light signal of wavelength $\lambda n$ lowers due to age deterioration or the like cause.

Furthermore, the optical amplifying/repeating transmission system according to the present invention includes a plurality of transmitters for sending out light signals of wavelengths differing one another and carrying information, a plurality of receivers for receiving the plurality of light signals of mutually different wavelengths, and a plurality of optical repeaters installed between the transmitters and the receivers for amplifying the plurality of light signals, and optical fibers interconnecting the transmitters and the optical repeater, the plurality of optical repeaters, and the optical repeater and the receivers, respectively, wherein the optical amplifying/repeating transmission system further includes a control signal generating means for modulating one of the plural light signals with a control signal of a specific frequency, a control signal level detecting means connected to the output of the optical repeater for extracting a part of output power of the optical repeater to thereby detect power of the control signal, and an optical repeater gain control means for controlling gain of the optical repeater so that level of the control signal detected by the control signal level detecting means remains constant, a monitor signal transmitting means for supplying transmission level of the control signal to the optical repeater, and a monitor/control means for receiving a monitoring signal supplied from the monitor signal transmitting means to thereby enable the optical repeater gain control means to operate when the level of the control signal is normal while disabling operation of the optical repeater gain control means with the gain thereof being held when the level of the control signal is abnormal. Thus, with the arrangement described above, the monitor/control circuit allows operation of the gain control system so long as the power of the light signal of wavelength $\lambda n$ is normal while suspending the operation of the gain control system by holding the attenuation factor of the adjustable optical attenuator to be constant when the power of the above wavelength is abnormal. By virtue of this feature, the gain of the optical repeater can be prevented from being set to an erroneous value even when the power of the light signal of wavelength in lowers due to age deterioration or the like cause.

In the optical communication system described above, the optical repeater gain control means is composed of an adjustable optical attenuator and a means for controlling the adjustable optical attenuator. Owing to this arrangement, there can be implemented the optical amplifying/repeating transmission system which ensure a constant gain independently of the input signal power or the number of the wavelengths thereof with a simplified structure.

Further, in the optical communication system described above, the control signal has a frequency higher than 100 kHz inclusive thereof. By virtue of this feature, stable amplification characteristics can be ensured for the fixed-gain optical amplifier without inducing variation thereof.

Furthermore, in the optical communication system described above, the monitoring signal has a wavelength shorter than those sent out from the plurality of transmitters. By virtue of this feature, the operating state control of the gain control system can be performed even in the event that the power of wavelength $\lambda n$ is interrupted for some reason.

Moreover, the optical amplifying repeater apparatus for amplifying a plurality of wavelength-multiplexed light signals according to the present invention includes a first fixed-gain optical amplifier for amplifying a plurality of wavelength-multiplexed light signals inputted thereto with a predetermined gain, a control light signal branching device for extracting a part of power of a control wavelength contained in the output of the first fixed-gain optical amplifier, an adjustable optical attenuator for attenuating the output of the first fixed-gain optical amplifier by a predetermined factor, an adjustable attenuator control circuit for detecting output power of the control light signal branching device to thereby control the attenuation factor of the adjustable optical attenuator so that the detected output power remains constant, and a second fixed-gain optical amplifier connected to output of the adjustable optical attenuator for amplifying the plural wavelength-multiplexed light signal inputted to the second fixed-gain optical amplifier with a predetermined gain. With the above arrangement, there can be realized the optical amplifying repeater apparatus having the gain which is independent of change of the number of wavelengths.

In the optical amplifying repeater apparatus described above further, an output breaking circuit for stopping amplifying function of the second fixed-gain optical amplifier upon detection of disappearance of output of the control light signal branching device is provided. With this arrangement, it is possible to prevent the output power of the second fixed-gain optical amplifier 4 from increasing abnormally even in the event that the control light is interrupted for some cause.

What is claimed is:

1. An optical amplifying repeater apparatus wherein the apparatus comprises:

an input port to which a plurality of light signals multiplexed in wavelength are inputted, a first fixed-gain optical amplifier for amplifying the wavelength-multiplexed light signals inputted through said input port with a predetermined gain, an adjustable optical attenuator for attenuating the wavelength-multiplexed light signals by a predetermined factor after amplification through said first fixed-gain optical amplifier, an optical demultiplexer for demultiplexing said wavelength-multiplexed light signals outputted from said adjustable optical attenuator into a plurality of individual light signals of discrete wavelengths, respectively, more than one second fixed-gain optical amplifiers for amplifying said plurality of individual wavelength-demultiplexed light signals outputted from said optical demultiplexer with a predetermined gain, a monitoring light branching device connected to one of outputs of said more than one second fixed-gain optical amplifiers for extracting a part of a specific monitoring light signal, an optical multiplexer for multiplexing the individual light signals outputted from said more than one second fixed-gain optical amplifiers, respectively, for thereby outputting multiplexed light signals, and an adjustable attenuator control circuit for detecting output power of said monitoring light branching device to thereby control the attenuation factor of said optical attenuator so that said detected output power assumes a constant value.

2. An optical amplifying repeater apparatus set forth in claim 1, wherein said first fixed-gain optical amplifier comprises an optical fiber serving as a transmission line, a pumping light source for inducing stimulated Raman amplifying action internally of said optical fiber in wavelength bands of said plurality of wavelength-multiplexed light signals, and an optical coupling device for coupling the output of said pumping light source with said plurality of wavelength-multiplexed light signals.

3. An optical amplifying repeater apparatus set forth in claim 1, wherein said first fixed-gain optical amplifier comprises an optical fiber doped with a rare-earth element or alternatively a transition metal, a pumping light source for inducing amplifying action under stimulated emission internally of said optical fiber in wavelength bands of said plurality of wavelength-multiplexed light signals, and an optical coupling device for coupling the output of said pumping light source with said plurality of wavelength-multiplexed light signals, wherein said optical fiber doped with said rare-earth element or alternatively said transition metal is operative in an unsaturated region.

4. An optical amplifying repeater apparatus set forth in claim 1, wherein said more than one second fixed-gain optical amplifiers comprises:

an optical amplifying unit composed of an optical fiber doped with a rare-earth element or alternatively a transition metal and a pumping light source for stimulating said rare-earth element or alternatively said transition metal to thereby bring about stimulated emission, a compensating light source for generating compensating light having a wavelength within an amplified wavelength band of said optical amplifying unit, a compensating light coupling device for coupling said compensating light with said plurality of wavelength-multiplexed light signals, a compensating light branching device for separating mutually the compensating light and the plurality wavelength-multiplexed light signals contained in the output of said optical amplifying unit, and a compensating light control circuit for controlling output power of said compensating light source such that ratio between power of the compensating light outputted from said compensating light branching device and power of the compensating light outputted from said compensating light source assumes a predetermined standard value.

5. An optical amplifying repeater apparatus set forth in claim 1, wherein said more than one second fixed-gain optical amplifiers comprises:

an optical amplifying unit composed of an optical fiber doped with a rare-earth element or alterrfatively a transition metal and a pumping light source for stimulating said rare-earth element or alternatively said transition metal to thereby bring about stimulated emission, and a compensating light control circuit for controlling output power of a compensating light source such that power of spontaneously emitted light outputted from said optical amplifying unit assumes a predetermined standard value.

6. An optical amplifying repeater apparatus set forth in claim 4, wherein said more than one second fixed-gain optical amplifiers includes:

an adjustable optical attenuator inserted at an input or output side, whereby means for changing the attenuation factor of said adjustable optical attenuator in dependence on ambient teminperature is implemented.

* * * * *